Nov. 15, 1932.  C. A. SIEWECK  1,887,724
AUTOMOBILE DASHBOARD HEAT SHIELD
Filed Sept. 8, 1931
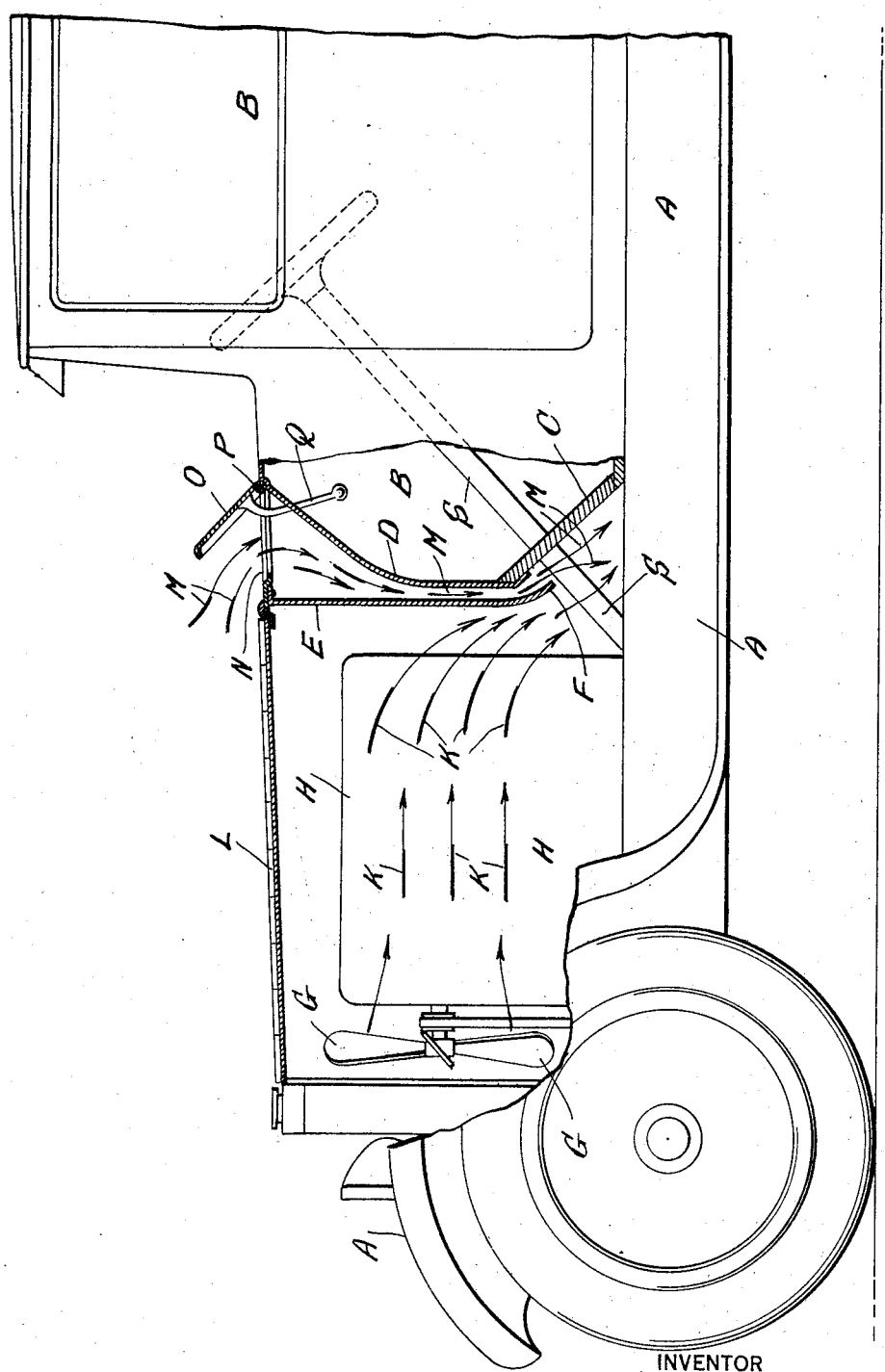
INVENTOR
Charles A. Sieweck
BY
M. H. Lockwood
ATTORNEY Patented Nov. 15, 1932

1,887,724

UNITED STATES PATENT OFFICE

CHARLES A. SIEWECK, OF NEW YORK, N. Y.

AUTOMOBILE DASHBOARD HEAT SHIELD

Application filed September 8, 1931. Serial No. 561,559.

This improvement relates to a shield for preventing the heat of the engine from penetrating the front or seating compartment of the car, to thereby avoid excessive heat and discomfort to passengers therein.

It is well known that the ordinary automobile engine develops a large amount of heat under the hood and a considerable part of this heat is transferred through the usual metal or other dashboard to the seating compartment of the car. In cold weather the heat may not be objectionable, but frequently there are ill-smelling gases and fumes. In the summer time, however, the passenger or seating compartment may become excessively or even unbearably overheated.

In either case, it is a common experience that fumes from the engine or from under the hood may pass backward into the seating compartment of the car and with the heat may contribute largely to still further render the seating compartment uncomfortable.

One object, therefore, of the present improvement is to provide a heat shield to prevent heat from the engine from passing back through the dashboard into the seating compartment of the car and preferably this heat shield shown and described comprises an air conduit or compartment forming a non-conducting air blanket or heat insulating shield in front of the dashboard, thereby excluding and preventing penetration of the heat of the engine into the seating compartment of the car.
Under some circumstances and conditions, a blanket of dead air may be used, but in the present instance, it is preferable to provide for the flow of air downward through the conduit or channel formed in front of the dashboard, so as to continuously renew the air blanket between the dashboard and the engine and more effectively prevent the penetration of heat into the interior of the car.

In order to provide for the circulation or flow of air through the blanket conduit, any suitable fan or blower arrangement may be used. For instance, the air may be driven across the mouth or outlet end of the dashboard conduit, which is preferably made narrow and curved backward, in order to provide the desired suction to draw the air through the conduit. In the present instance, however, the usual radiator fan is utilized to obtain the necessary suction through the conduit.

A further object is to provide means for regulating the flow of air through the blanket conduit, and preferably for this purpose, a cowl or lid is provided at the upper end which may be opened to a greater or less extent, or completely closed during cold or stormy weather. The scooping effect of the cowl with the motion of the car will assist the passage of air into and through the conduit.

One form of the improved automobile dashboard heat shield is shown in the accompanying drawing, wherein the front part of an automobile is shown, with the hood compartment and dashboard shown in section.

Referring to the drawing, the automobile A is provided with the usual passenger or seating compartment B. The front part of the floor at C of the driving and seating compartment extends upward at an angle and through this floor board the usual steering post S projects. Extending upward from the flooring board C is the dashboard D, which is usually formed of sheet metal, but obviously, may be made of any usual or preferred material.

In order to provide insulation from the heat of the engine, the heat protecting air blanket of the present improvement is formed by mounting a partition E in front of the dashboard D and spaced therefrom to form a thin conduit substantially the full width of the dashboard. It will be understood, however, that conduits for different cars may vary in width, it being understood that a conduit need not be any wider than necessary to protect the interior driving or seating compartment from the heat of the engine.

The lower end of the partition E, or front wall of the air blanket conduit, is preferably curved rearward at F to form a sort of suction or injector nozzle to induce the suction of air down through the air blanket conduit or channel between the partition E and dashboard D. In order to induce the suction or passage of the air through the conduit D—E, any suitable fan or blower means may be employed, but preferably the radiator fan G is utilized, since it is continuously rotated by the engine H (not shown in detail). Arrows K are shown to indicate the circulation of the air under the hood L and past the lower end F of the air blanket conduit. The path of the air circulating through the conduit is indicated by arrows M.

Obviously, for circulation of air down through the air blanket conduit, both ends of the conduit are open and the upper end N is preferably wider in cross-section or area, as shown, and provided with a cowl or lid O, hinged at P, in front of the dashboard D, so that the admission of air to the air blanket conduit may be regulated. A suitable handle Q, attached to the cowl and entering the compartment of the car, is provided for opening and closing the cowl.

The operation of the improvement will be understood from the description given, and it will be seen that in cold weather the cowl O may be entirely closed, thus forming substantially a blanket of dead air, which will protect the front compartment from the excessive transmission of heat from the engine into the seating compartment. In hot rainy weather the cowl O may be left open, thereby keeping the interior of the car comfortable although the windows are closed.

However, when driving the car on hot days, the cowl O should be opened to a greater or less extent and then the scooping effect of the cowl, due to the motion of the car, alone or in addition to the suction effect of the radiator fan G, driving the air under the hood across the mouth F of the conduit, will create a rapid circulation of the air down through the air blanket conduit, thus carrying away the heat as fast as it may penetrate the wall E of the conduit or air blanket compartment. It will be understood that this rapid circulation of the air will not only keep the seating compartment at the front of the car cool, but will assist in preventing the entrance thereinto of fumes and obnoxious gases from the engine.

It will be understood that while the preferred form of the improvement has been shown, it is not desired to be limited to the specific details of construction and the arrangement shown, for various modifications therein may be made without departing from the spirit and scope of the invention.

I claim:—

1. In an automobile having an engine hood chamber and a radiator air circulating fan therein, a dashboard heat shield comprising a dashboard member, a conduit wall located in front of and substantially parallel with said dashboard member and spaced from the latter to form a relatively thin air blanket conduit between said chamber and the dashboard, said conduit being open at its ends, the lower end being shaped as a nozzle to discharge below the floor, said nozzle end being located within said hood chamber whereby said fan is utilized for creating suction to draw air down through said conduit.

2. The automobile dashboard heat shield as claimed in claim 1, wherein means is provided for regulating the admission of air into the upper end of said conduit, said means being located in front of the dashboard.

CHARLES A. SIEWECK.